(12) United States Patent
Simpson

(10) Patent No.: US 9,511,864 B2
(45) Date of Patent: Dec. 6, 2016

(54) INTERIOR TRIM COMPONENTS FOR AIRCRAFT CABINS

(75) Inventor: Leslie James Simpson, Wendover (GB)

(73) Assignee: MGR Foamtex Limited, Thame (GB)

(*) Notice: Subject to any disclaimer, the term of this patent is extended or adjusted under 35 U.S.C. 154(b) by 0 days.

(21) Appl. No.: 13/303,303

(22) Filed: Nov. 23, 2011

(65) Prior Publication Data

US 2012/0133192 A1 May 31, 2012

(30) Foreign Application Priority Data

Nov. 25, 2010 (GB) .................................. 1020018.6

(51) Int. Cl.
*E04C 2/38* (2006.01)
*B64D 11/06* (2006.01)
*A63H 5/04* (2006.01)

(52) U.S. Cl.
CPC ............ *B64D 11/0606* (2014.12); *A63H 5/04* (2013.01); *B64D 11/06* (2013.01); *B64D 11/0604* (2014.12); *B64D 11/064* (2014.12); *B64D 11/0641* (2014.12); *B64D 11/0643* (2014.12); *B64D 11/0647* (2014.12); *B64D 11/06395* (2014.12); *Y10T 428/24008* (2015.01); *Y10T 428/24496* (2015.01); *Y10T 428/249983* (2015.04)

(58) Field of Classification Search
CPC ... B60R 13/02; B64D 11/0606; B64D 11/064; B64D 11/0643; B64D 11/0641; B64D 11/06395; B64D 11/0647; B64D 11/0604; B64D 11/06; A63H 5/04; Y10T 428/249983; Y10T 428/24496; Y10T 248/24008
USPC ........... 52/716.3, 716.1, 716.7, 716.8, 309.9; 244/122 R
See application file for complete search history.

(56) References Cited

U.S. PATENT DOCUMENTS

| 3,461,026 A | * | 8/1969 | Schick .......................... 442/339 |
| 4,027,916 A | | 6/1977 | McElroy |
| 4,638,995 A | * | 1/1987 | Wilson .......................... 482/142 |
| 4,838,609 A | * | 6/1989 | Christensen .................. 297/277 |
| 5,080,431 A | | 1/1992 | Frazier |
| 5,279,528 A | * | 1/1994 | Dalebout et al. ............... 482/54 |
| 6,241,188 B1 | * | 6/2001 | Simpson et al. .......... 244/122 R |
| 2011/0084164 A1 | | 4/2011 | Lee |

FOREIGN PATENT DOCUMENTS

| DE | 10020249 A1 | 11/2001 |
| DE | 10340951 A1 | 4/2005 |

(Continued)

OTHER PUBLICATIONS

Search report in GB1020018.6.

(Continued)

*Primary Examiner* — Basil Katcheves
(74) *Attorney, Agent, or Firm* — Nelson Mullins Riley & Scarborough LLP

(57) ABSTRACT

A soft interior trim component for an aircraft cabin, for example a headboard cover for a lie-flat seat, as a soft layer of foam (24, 124) the front of which is covered by a cover (40). The component is attached to a surface to be covered by attachment means (26, 28-32; 126, 129) which enable the component to be easily removed for replacement and/or cleaning. The attachment may comprise a double-sided adhesive tape (26; 126) and a series of fasteners (28-32).

16 Claims, 3 Drawing Sheets

(56) References Cited

FOREIGN PATENT DOCUMENTS

| | | |
|---|---|---|
| DE | 102007052352 A1 | 5/2008 |
| EP | 1000852 A1 | 5/2000 |
| EP | 1000856 A1 | 5/2000 |
| GB | 2466329 A | 6/2010 |

OTHER PUBLICATIONS

Search report of May 11, 2012 in EP 11190409.0.
Collins English Dictionary, 11th Edition, page including definition of "trim".

* cited by examiner

INTERIOR TRIM COMPONENTS FOR AIRCRAFT CABINS

FIELD OF THE INVENTION

This invention relates to a soft interior trim component for an aircraft cabin, and to a structure and/or surface of an aircraft cabin, for example a headboard of a seat, when covered by the component.

BACKGROUND OF THE INVENTION

Passenger aircraft interiors have to comply with very stringent flammability standards relating to all components manufactured for and installed in an aircraft. Thus, for example, vertical walls or large panels such as bulkheads, dividers, galley walls and lavatory walls have to meet FAA and EASA regulations concerning acceptable levels of heat release, smoke emission and generation of toxic fumes, when exposed to heat, to aid safe and speedy evacuation of the aircraft in an emergency. To that end, vertical walls and large panels are typically made from composite boards with a decorative laminate glued on during manufacture.

As the laminate surface is non-porous, dirt can be easily wiped off, but any repair or replacement requires aircraft down time in a hanger and therefore needs to be carried out at a major maintenance check. Sometimes, soft materials, for examples a tapestry, are used but these tend to be located in non-passenger areas at the forward part of the cabin.

Typically, many of the surfaces around an aircraft seat, other than the seat cushions and arm rests, are unyielding and non-permeable. This facilitates cleaning, but can be detrimental to passenger comfort. The advent of lie flat beds in first and business class premium cabins has led to a demand for more soft surfaces to be used in the cabins to improve the passenger experience during flight. This is especially important during night time flying where a passenger lying on a lie flat bed may come into contact with surfaces, such as a headboard, partition or side wall in close proximity to the seat cushions/mattress on which the passenger is lying. It is felt that the use of such soft surfaces improve the passenger experience during flight.

One known approach to providing a soft cover for hard interior surfaces of an aircraft is to bond to the surface a closed cell fluoropolymer foam which itself carries a decorative outer cover.

However, this approach is not practicable for surfaces, such as those around the seat cushions/mattress which frequently come into contact with passengers since those surfaces would require frequent cleaning, and this would be unduly time consuming and expensive.

SUMMARY OF THE INVENTION

According to a first aspect of the invention, there is provided a soft interior trim component for an aircraft cabin, the component comprising a layer of a foam, a cover attached to said layer and extending over the front of the component, and attachment means for attaching the component, at its rear, to a surface to be covered by the component, wherein the attachment means, in use, releasably attaches the component to the surface.

Preferably the foam layer is soft.

The attachment means allows the component readily to be removed once worn or soiled, and replaced with a similar new, or cleaned, trim component.

Preferably, the attachment means is such as to provide a touch and close fastening between the component and the surface to be covered.

Thus the component can be attached simply by pressing it against the surface to be covered, while the component is correctly positioned relative to that surface.

Such attachment means may conveniently comprise a pressure sensitive adhesive surface.

Such an adhesive surface may be fixed to the surface to be covered, but is preferably mounted directly, or indirectly on the back of the foam layer, so as to remain with the rest of the component when the latter is being removed.

Preferably, the adhesive surface is one side of a double sided adhesive tape.

Preferably, the foam layer includes a recess for at least partially accommodating the tape.

This helps to ensure that, with the trim component installed, a passenger could not feel the tape through the front of the component, and/or that the tape does not produce any obvious ridge in the front of the component.

The attachment means may to advantage comprise a fastening element for co-operating with a complementary element on the surface to be covered, or another surface in a position fixed relative thereto.

Preferably, the fastening element is one of a plurality of such elements.

The attachment means could take the form of just said elements or said adhesive surface or tape.

Preferably, however, the attachment means comprises said plurality of fastening elements and said adhesive surface or double sided adhesive tape.

With such an attachment means, the fastening elements can provide a fail safe for the adhesive surface.

Preferably, each fastening element comprises a protuberance for matingly engaging a respective female connector portion, such as an aperture, in the surface to be covered or surface fixed relative thereto.

This feature enables the fastening element to be used to facilitate the correct positioning of the component, by aligning each protuberance with its respective female connector portion.

The fastening elements may conveniently comprise clips or plugs, preferably fir tree clips.

Preferably, the foam layer includes a recess for accommodating the inboard ends of the fasteners.

This helps to ensure that fasteners do not distort the front of the component.

Preferably, the foam layer is exposed at the back of the trim component.

This simplifies construction and reduces material costs of the component.

The component may be a cover for an aircraft cabin bulkhead, divider, toilet or galley wall or side wall panel, dado panels (running along the length of the cabin) stowage compartment panels, and wall panels in the vicinity of aircraft boarding doors.

Preferably, the component is for use as a cover for structures and/or surfaces which are in close proximity to the seat cushions of an aircraft seat, and with which a passenger is likely to come into contact when seated.

Preferably, the component comprises a headboard cover for a passenger seat/bed stop.

Preferably, the foam layer is no more than 6 mm thick.

Preferably, the foam is a closed cell foam, preferably a fluoropolymer closed cell foam.

Examples of the latter type of foam are described in WO 2005/105907. The foam is preferably the ZOTEK® F fluoropolymer foam or any substantially similar foam, with substantially similar characteristics, made by Zotefoams.

The invention also lies in a surface or structure in an aircraft cabin and a cover in accordance with the first aspect of the invention, wherein the cover is removably attached to said surface or structure.

Said structure or surface may, for example, comprise the headboard of a passenger seat.

Where the trim component includes fastening elements, said surface or structure to be covered is preferably provided with complementary fastening elements.

Where the fastening elements on the component comprise protuberances, the corresponding elements may to advantage comprise apertures in the surface or structure to be covered.

BRIEF DESCRIPTION OF THE DRAWINGS

The invention will now be described, by way of example only, with reference to the accompanying drawings in which.

DETAILED DESCRIPTION OF THE DRAWINGS

Figure 1:
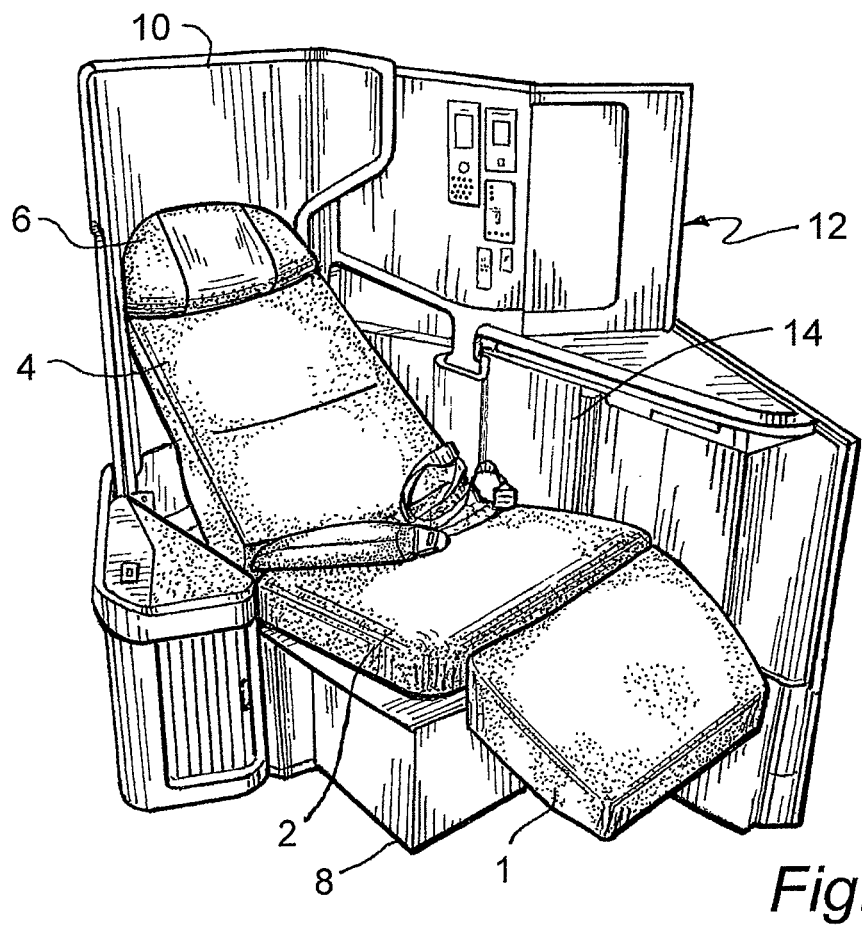
FIG. 1 is a perspective view of a "lie flat" seat of a passenger aircraft cabin having a structure, in the vicinity of the seat cushions, which can be covered by a soft interior trim component in accordance with the invention.

The seat shown in FIG. 1 has a number of cushioned portions which, in use, support a passenger. More specifically, the seat has a foot rest portion 1 pivotally connected to the seat portion 2 which is in turn pivotally connected to a back rest portion 4 at the top of which there is provided a head rest 6. The seat is mounted on a support 8 that houses motors (not shown) for pivoting the portions relative to each other and for sliding the pivotal axes between the portions 1 and 2 and the portions 2 and 4 backwards and forwards so that the seat can be moved from a fully upright position, to a partially reclined position, as shown in FIG. 1 and subsequently into a fully reclined position, in which the portions 4, 2 and 1 are substantially aligned with each other and are horizontal or almost horizontal. In the latter position, the cushions of the portions 1, 2, 4 and 6 act as a mattress on which a passenger can sleep.

Typically, lie flat seats in premium class cabins are surrounded by various different types of structure which can help to provide a degree of privacy for the passenger. In the arrangement shown in FIG. 1, a headboard 10 extends behind the backrest 4 and headrest 6 and there is provided a dividing structure, generally referenced 12, which provides some seclusion from the neighbouring seat, and which also provides storage for various items for example a video display and/or certain controls that the passenger might wish to operate during the flight. This structure also includes a side wall 14 immediately adjacent to the seat portion 2 and backrest 4.

During a long flight, parts of the passenger's body may well rest against the headboard 10 or side wall 14, especially if the seat is in its lie flat configuration. If those surfaces are hard, or cold, they may therefore detract from the passenger's comfort during the flight. It is therefore desirable for headboard 10 and side wall 14 in particular, to be provided with a soft cover, and to that end a cabin trim component in accordance with the invention may to advantage be used.

Figure 2:
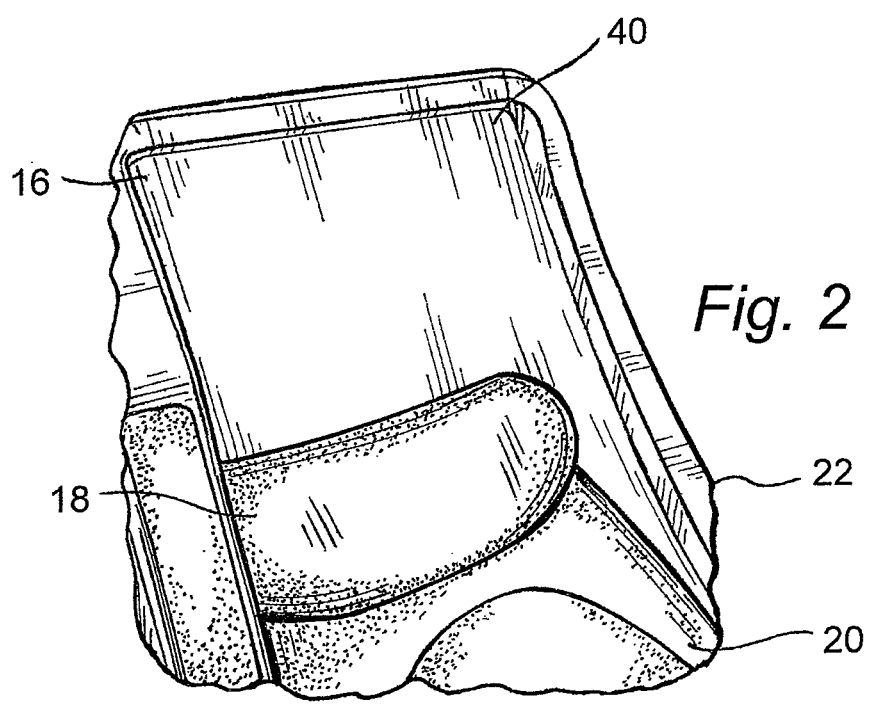
FIG. 2 shows the upper part of a "lie flat" seat having a headboard fitted with a trim component in accordance with the invention.

In FIG. 2, such a component is shown at 16, and is being used as a cover for the headboard for a seat, the headrest and backrest of which are shown at 18 and 20. As can be seen from FIG. 2, this particular seat includes a pod-like structure 22 around the backrest 20 and headrest 18, the headboard being formed by the interior surface of that structure, and the cover is shaped to extend across the top of the headboard and to curve around, with the headboard, so as to extend along the portions of the structure 22 which will be beside the headrest 18 when the seat is reclined.

Figure 3:
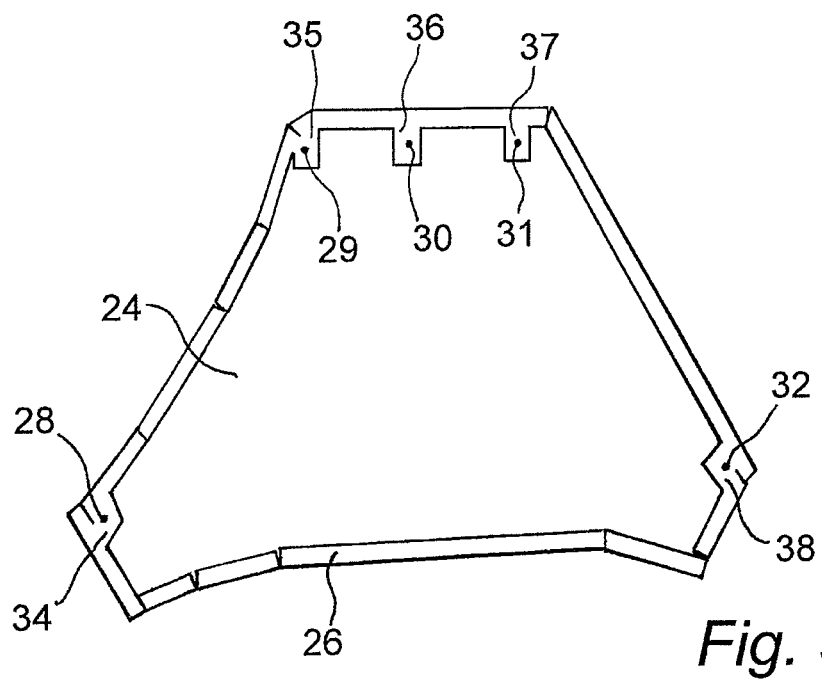
FIG. 3 shows the trim component, prior to attachment to the headboard, from behind.

The shape that the trim component has in order to provide this coverage is best appreciated from FIG. 3. The trim component comprises a foam layer in the form of a 6 mm thick panel of a closed cell fluoropolymer foam in accordance with any of the examples of foam described in WO 2005/105907. Alternatively the foam may be of the type currently sold under the trade name ZOTEK F OSU Flexible by Zotek Limited. Details of this foam are set out in Appendix 1 hereto.

A recess is machined into the perimeter of the rear of the foam panel 24 so as to accommodate a number of substantially contiguous sections of FR double sided, pressure sensitive adhesive tape 26. In the present example the tape is Permacel™ P55 double sided tape, information on which is set out in Appendix 2 hereto.

The back of the foam panel 24 also includes a number of recesses, each of which accommodates the head of a respective one of five fir tree clips 28-32. Each of the fir tree clips extends through an aperture in a respective patch of adhesive tape (the patches being denoted by reference numerals 34-38) the heads of the fir tree clips (the inboard ends of the clips) which extend into the corresponding recesses in the back of the foam panel, are held against the panel by the tape patches which, consequently, retain the clips in position on the panel. The tape constituting the patches in this example is Glass Cloth Tape, such as 3M™ 399FR tape. Such tape has an acrylic adhesive for many applications requiring high adhesion, an abrasion-resistant backing and flame retardant properties. This product is typically used for sealing aircraft cargo bay panels to provide a permanent seal.

The headboard is provided with a series of apertures (which may be drilled into the headboard or take the form of a preformed receptacle), each of which receives a respective one of the fir tree clips. The front of the component 16 includes a decorative cover 40 bonded to the front of the foam panel 24. The cover extends over the edge of the foam panel to form a hem, as can be seen from FIG. 4, and the portion that extends over the edge is bonded to the back of the foam panel at the recess which accommodates the tape 26. The tape 26 therefore, at least in part, is adhered to that portion of the cover.

Figure 4:
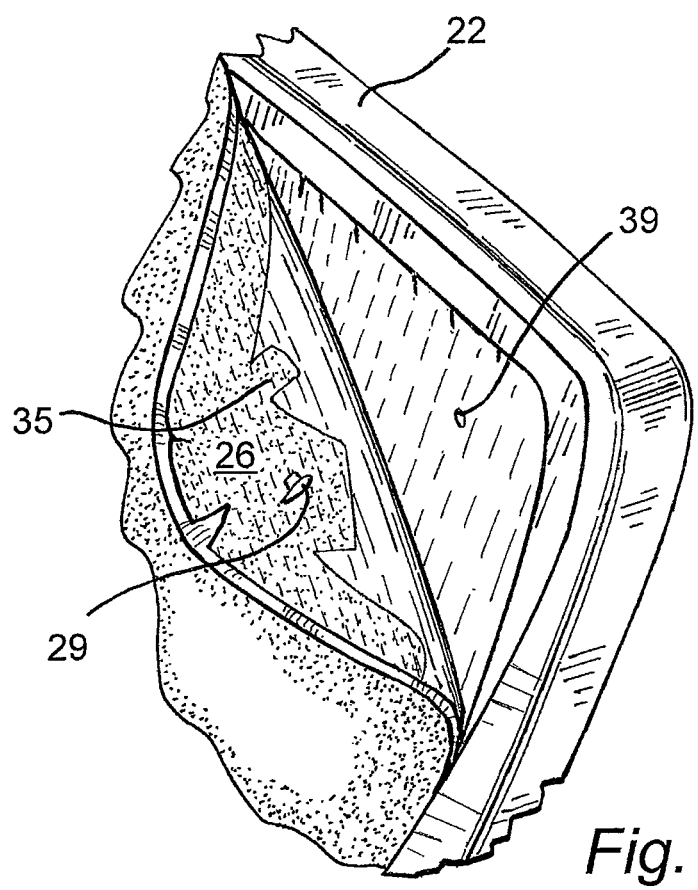
FIG. 4 is a close up view of the trim component which is on the headboard, but which is partially peeled back to illustrate how the component is attached to the headboard.

One of the apertures in the headboard, which corresponds to clip 29, is shown at 39 in FIG. 4.

The decorative cover is formed from one of a range of approved decorative materials that meet the requirements of:

FAR/JAR/CS 25.853 (a) Appendix F, Part I a(1) i 60 Sec Vertical
FAR/JAR/CS 25.853 (a) Appendix F, Part I a(1) ii12 Second Vertical tests
FAR/JAR/CS 25.853 (d) Appendix F, Part IV Heat Release
FAR/JAR/CS 25.853 (d) Appendix F, Part V Smoke Emission The foam panel is then cut to shape and recesses for the tape and the heads of the clips are then machined, and then the decorative covering 40 is bonded to the foam panel and edge sealed. The double sided tape is in position around the outer edge/periphery of the panel and the clips bonded into place.

The cover 40 is bonded to the foam panel 24 using a water dispersed, high solid, contact adhesive, for example Fastbond™ contact adhesive 2000-NF produced by 3M. The adhesive is sprayed onto the foam or the back of the cover 24 and the latter is then pressed in place on the foam panel 24.

When the panel is to be fitted, it is first positioned in front of the headboard with the clips in register with their corresponding apertures in the headboard. The component is then pressed into place so that the clips enter into and engage the apertures and the double sided tape 26 adheres the component to the headboard about the edges of the component. In the arrangement shown in FIG. 4, the headboard already carries an underlying foam layer 42 (bonded thereto), although it will be appreciated that it is within the scope of the invention for the surface to which the component is presented to be hard.

In use, the trim component will frequently come into contact with passengers and after a period of time will therefore become worn and/or soiled. The attachment means provided by the adhesive tape and fir tree clips enables soiled/worn panels to be rapidly removed and replaced with fresh or new panels. The soiled/worn panels may be disposed of, or (in the case of light soiling) taken for subsequent cleaning and reuse.

The double sided tape 26 may include a backing strip which covers the rearward facing adhesive surface of the tape to protect the latter prior to the installation of the component. In this case, of course, the backing tape is removed before the component is installed.

Figure 5:
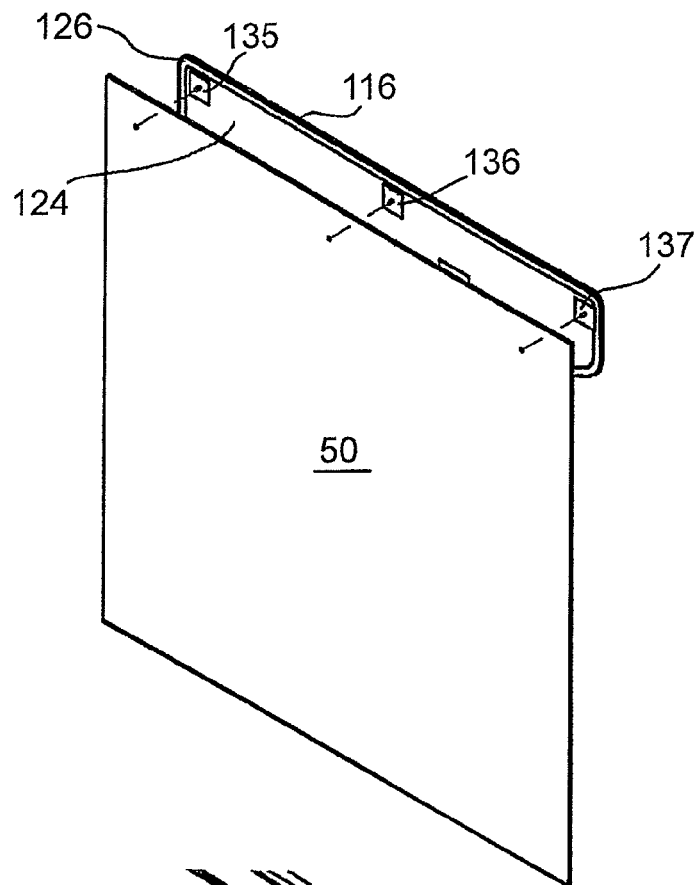
FIG. 5 is an exploded isometric view of a wall panel and another trim component in accordance with the invention.
Figure 6:
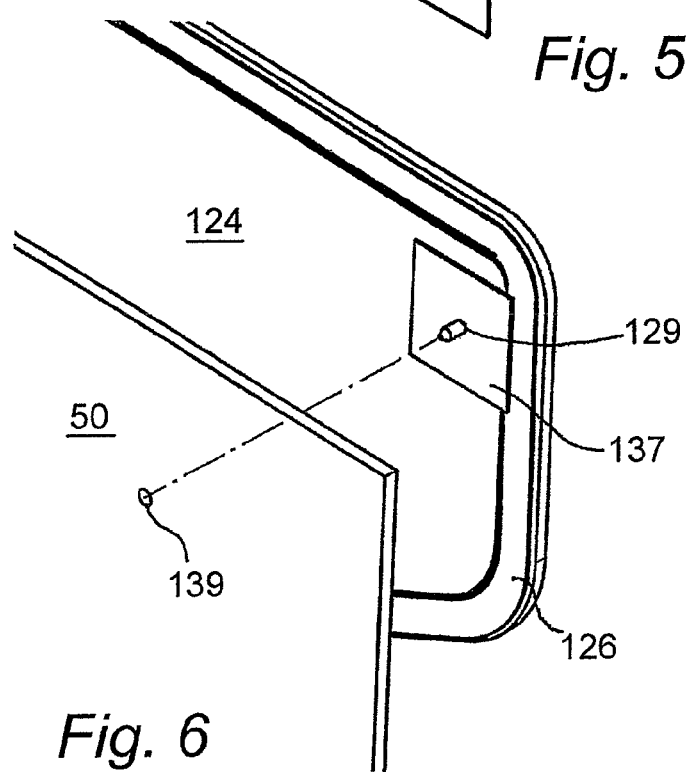
FIG. 6 is a more detailed view of the arrangement in FIG. 5, showing how the trim component is attached to the wall panel.

FIGS. 5 and 6 show a similar type of component, and therefore the features that correspond to those of the component of FIGS. 2-4 are shown by the same reference numerals, raised by 100. In this particular case, the component is for use in covering a flat side wall panel 50. Thus the component has the same structure as the component 16, and only differs in respect of its shape and dimensions, which are chosen to enable the component to be appropriately fitted to the side wall panel 50.

It will be appreciated that the invention is applicable to any soft trim component for an aircraft cabin, and that the type and nature of foam chosen for the panel may vary depending on the requirement for the component. Thus, for example, in some instances the foam may be of the type currently sold as ZOTEK® F OSU semi-rigid. Details of this foam are set out in Appendix 3 hereto.

The invention claimed is:

1. In combination, an aircraft having an interior cabin including at least one structural wall or door panel, and an aircraft trim component covering the structural panel, the trim component being characterized by a selected softness and selected structural dimensions, shape, configuration and rigidity suitable for conforming to the structural panel, the trim component comprising a layer of a soft resilient foam, the foam comprising a polyvinylidene fluoride closed cell foam, a cover attached to and extending over a front side of said foam layer, and attachment means at a rear side of said foam layer for releasably attaching the trim component to the structural panel in covering relation thereto, the attachment means comprising a first fastener device including a protuberance projecting from one of the structural panel and the trim component and a female connector portion on the other of the structural panel and the trim component in mating releasable engagement with one another and a second fastener device releasably adhering the trim component to the structural panel at a location closely adjacent to the first fastener device, the attachment means providing secure attachment of the trim component to the structural panel and permitting releasable detachment of the trim component from the structural panel without damage thereto.

2. A combination according to claim 1, in which the attachment means is such as to provide a touch and close fastening between the component and the non seating panel.

3. A combination according to claim 1, in which the second fastener device comprises a pressure sensitive adhesive surface.

4. A combination according to claim 3, in which the adhesive surface is mounted on the back of the foam layer, so as to remain with the rest of the trim component when the latter is being removed.

5. A combination according to claim 3, in which the adhesive surface is one side of a double sided adhesive tape, the other side of which is adhered to one of the back of the foam layer or an intervening material on the back of the foam layer.

6. A component according to claim 5, in which the foam layer includes a recess for at least partially accommodating the tape, wherein the recess and the tape or a number of substantially contiguous sections of the tape extend around the perimeter of the foam layer.

7. A combination according to claim 1, in which the attachment means is one of a plurality of such attachment means.

8. A combination according to claim 7, in which the protuberances comprise clips or plugs.

9. A combination according to claim 8, in which the protuberances comprise fir tree clips.

10. A combination according to claim 7, in which the foam layer includes recesses for accommodating the inboard ends of the protuberances.

11. A combination according to claim 1, in which the foam layer is exposed at the back of the trim component.

12. A combination according to claim 1, in which the foam layer comprises a panel which is no more than 6 mm thick.

13. A combination according to claim 1, in which the structural panel is a toilet or galley wall.

14. A combination according to claim 1, wherein the second fastener device at least generally surrounds at least one of the protuberance and the female connector portion.

15. A combination according to claim 1, wherein the second fastener device comprises a double-sided adhesive tape substantially surrounding one of the protuberance and the female connector portion for releasable bonding thereof to one another.

16. A combination according to claim 1, wherein the interior cabin of the aircraft further comprises an aircraft passenger seat having a headrest and the structural panel is a vertical headboard adjacent to and spaced from the seat, wherein the seat is movable into a lie flat configuration to form a bed with the headrest of the seat disposed adjacent the headboard.

* * * * *